M. C. HONEYWELL.
SAFETY RELIEF DEVICE FOR LOW PRESSURE STEAM BOILERS.
APPLICATION FILED APR. 3, 1916.

Patented Oct. 16, 1917.

WITNESSES:
Frank A. Fahle
Josephine Gasper

INVENTOR
Mark C. Honeywell,
BY
Hood & Schley
ATTORNEYS

M. C. HONEYWELL.
SAFETY RELIEF DEVICE FOR LOW PRESSURE STEAM BOILERS.
APPLICATION FILED APR. 3, 1916.
1,243,604.
Patented Oct. 16, 1917.
2 SHEETS—SHEET 2
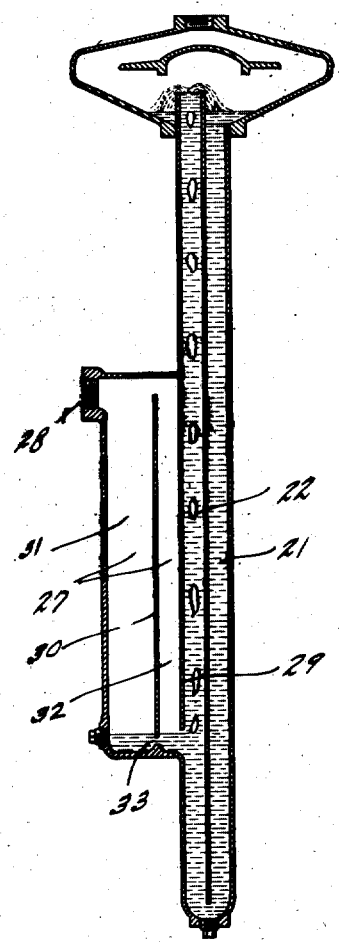
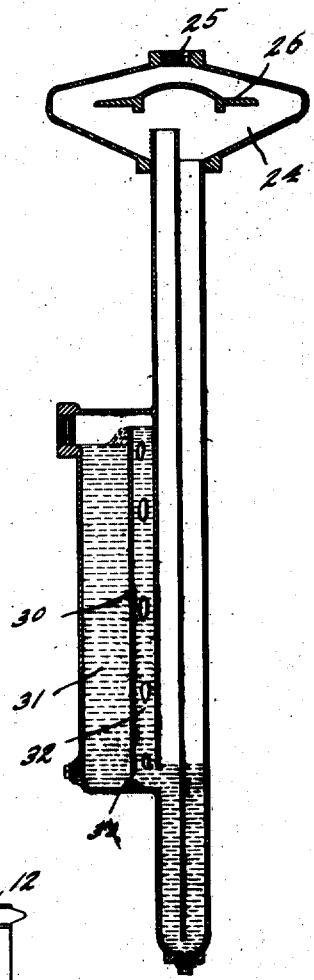
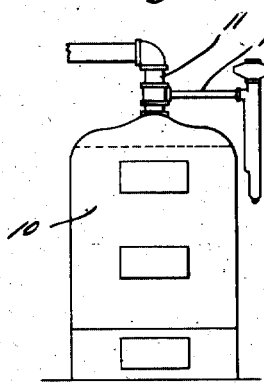
WITNESSES:
Frank A. Sahle
Josephine Gasper
INVENTOR
Mark C. Honeywell,
BY
Hood & Schley
ATTORNEYS

UNITED STATES PATENT OFFICE.

MARK C. HONEYWELL, OF WABASH, INDIANA, ASSIGNOR TO HONEYWELL HEATING SPECIALTIES COMPANY, OF WABASH, INDIANA, A CORPORATION OF INDIANA.

SAFETY RELIEF DEVICE FOR LOW-PRESSURE STEAM-BOILERS.

1,243,604.  Specification of Letters Patent.  Patented Oct. 16, 1917.

Application filed April 3, 1916. Serial No. 88,574.

*To all whom it may concern:*

Be it known that I, MARK C. HONEYWELL, a citizen of the United States, residing at Wabash, in the county of Wabash and State of Indiana, have invented a new and useful Safety Relief Device for Low-Pressure Steam-Boilers, of which the following is a specification.

The advent of low pressure vapor heating, which has occurred comparatively recently, has created a demand for a device which will positively relieve at a low predetermined pressure, usually of from nine to fifteen ounces. This is exceedingly difficult, if not impossible, to obtain with reliability by a mechanical device.

It is the object of my present invention to provide such a device, and one which will at the same time be positive in action and inexpensive to construct and install, which requires no other material than water and air and suitable conduits and chambers, which automatically re-sets itself to maintain the desired pressure when the excess pressure condition is relieved, and which if desired will, without interfering with the sealing action against normal pressure in the associated heating system, permit an ingress of air to such system if a considerable vacuum at times be produced in such system.

Figure 1:
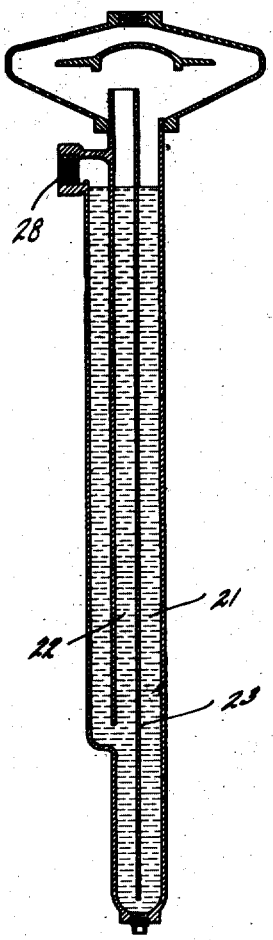
Figure 2:
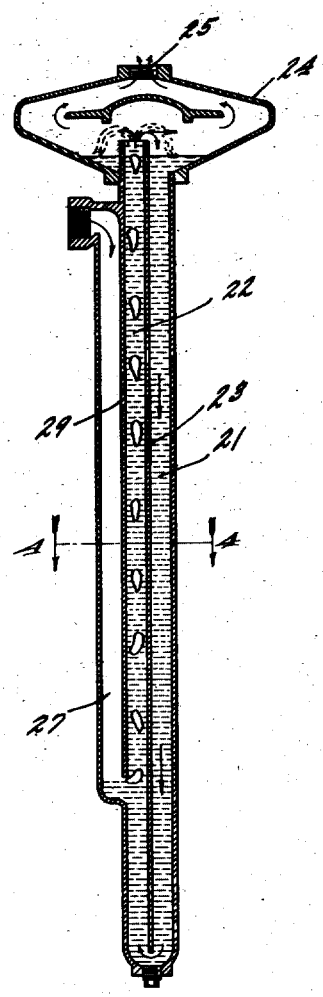
Figure 3:
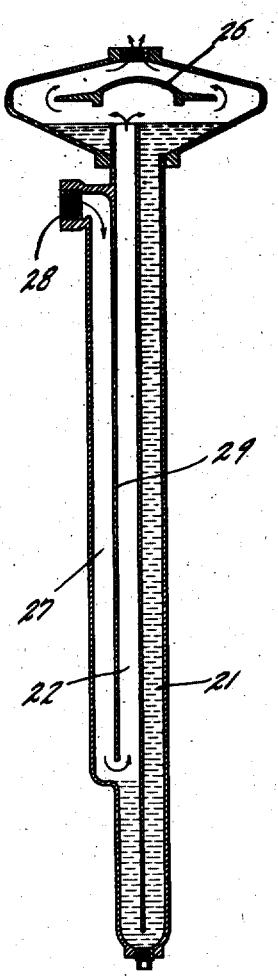
Figure 4:
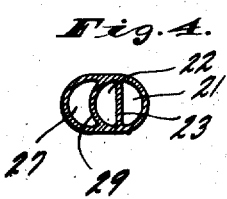

The accompanying drawings illustrate my invention. Figure 1 is a vertical longitudinal section through a relief device embodying my invention, showing the condition when the pressure in the system is equal to that of the atmosphere; Fig. 2 is a similar view, showing the condition when the pressure in the system has risen to the predetermined point for gradual relief; Fig. 3 is a similar view, showing the condition when this point of gradual relief has been slightly exceeded and there is a rapid relief of pressure; Fig. 4 is a section on the line 4—4 of Fig. 2; Fig. 5 is a view similar to Fig. 2, showing a modified construction under conditions for gradual relief; Fig. 6 is a view showing the structure of Fig. 5, under conditions permitting ingress of air to the associated heating system; and Fig. 7 is an elevation of a boiler and part of the vapor supply system, showing my safety relief device applied thereto.

The boiler 10 for supplying the low pressure vapor for heating is of any suitable character and is connected with the heating system through the usual pipe 11. At any point above the water line on the heating system a connection 12 is provided for leading to my pressure relief device. This connection is shown close to the boiler 10, but the connection may be at any desired place above the water line.

The pressure relief device comprises fundamentally two water-circulating tubes 21 and 22 which are separated from each other by a partition 23 which extends nearly but not quite to the bottom of the circulating tubes so that the two circulating tubes are connected at the bottom beneath such partition; a separating chamber 24 at the top of the two circulating tubes 21 and 22 and into which the tube 22 projects a considerable distance, said chamber 24 being provided at the top with an outlet 25 which may be connected to any convenient point of discharge if it is desired to carry the discharge away and with an umbrella baffle plate 26 located in the chamber 24 between the upper ends of the circulating tubes 21 and 22 and the outlet 25; and a pressure tube 27 paralleling the circulating tubes 21 and 22, said pressure tube being provided at the top with an opening 28 for receiving the connection 12 from the heating system and being connected at the bottom to an intermediate point on the circulating tube 22 fairly near the bottom thereof, this connection being by an opening at the lower edge of the partition 29 separating the tube 27 from the circulating tube 22.

Thus the three tubes 21, 22, and 27 are all interconnected, so that when filled with water as shown in Fig. 1 the water level in all said three tubes is the same under balanced pressures—that is, when the pressure in the system equals that of the atmosphere—as indicated in Fig. 1. The filling of the tubes with water may conveniently be through the outlet 25, and after the tubes are once filled any loss is replenished by condensation from the heating system. When the water in the boiler 10 is heated, vapor or low pressure steam is produced, and this pressure is transmitted through the connection 12 and the opening 28 to the upper surface of the water in the tube 27, forcing down the water in such tube and correspondingly raising it in the tubes 21 and 22. By reason of the connection of the two tubes 21 and 22 below the partition 23, the water levels in such two tubes remain always equal as long as the water level in the tube 27 is above the opening at the bottom of the partition 29, and the pressure on the heating system is equal to the water column due to the difference between the water level in the tube 27 and the water level in the tubes 21 and 22.

When the pressure in the heating system increases, the water level in the tube 27 is further depressed, until it falls below the lower edge of the partition 29. Then the steam or water vapor escapes in small bubbles under the lower edge of the partition 29 from the tube 27 into the tube 22, rising in such tube and escaping at the top thereof, as shown in Fig. 2. These bubbles carry upward with them the water in the tube 22, which water overflows from the top of such tube into the chamber 24 and returns through the tube 21 and beneath the lower edge of the partition 23 to the bottom of the tube 22, as indicated by the arrows in Fig. 2, so that under this condition there is a continuous circulation of water upward through the tube 22 and downward through the tube 21. The bubbles of steam or water vapor separate from the water in the chamber 24, pass around the edges of the umbrella plate 26, and escape through the outlet 25. This condition continues as long as the pressure in the heating system remains sufficient to depress the water level in the tube 27 just barely below the lower edge of the partition 29. If the pressure diminishes such water level rises and the escape of steam or water vapor ceases. However, if the pressure rises slightly further, the water level in the tube 27 is depressed further and the water driven completely out of such tube, so as to uncover the entire opening below the partition 29. The steam now passes out from the tube 27 through this opening and into the tube 22, holding down in such tube 22 the water which is below such opening and driving upward and entirely out of the tube the water above such opening, so as to allow a clear passage for the steam or water vapor at this pressure. This is shown in Fig. 3. The chamber 24 is of sufficient size so that the water which is thus driven out of the tube 21 is retained in such chamber, preferably at a level not to exceed the top of the tube 22. This rapidly relieves the excess pressure, and occurs at only a slightly greater pressure than is required to produce the gradual relief of the pressure illustrated in Fig. 2. Thus the pressure on the system is positively relieved at a definite low pressure, and the pressure thus cannot exceed that which is necessary to support the unbalanced water column in the tube 21 under the condition shown in Fig. 3.

The tube 27 may be either a simple tube, as shown in Figs. 1, 2, and 3, or may be divided by a vertical partition 30 into two tubes 31 and 32, which together form the tube 27, as shown in Figs. 5 and 6. The partition 30 is provided at the bottom with an opening 33 the upper edge of which is lower than the lower edge of the partition 29; and at the top extends to a higher level than the lower edge of the opening 28 but not quite to the top of the tube 32, so that the tubes 31 and 33 are connected at both top and bottom. Under pressure conditions in the heating system, the arrangement shown in Figs. 5 and 6 acts exactly the same as that shown in Figs. 1, 2, and 3, the steam or vapor acting simultaneously on the upper surface of the water in the two tubes 31 and 32, and pressing down the water level in such two tubes simultaneously and equally, to permit the escape of steam in bubbles or in a continuous stream exactly as described and as illustrated in Figs. 2 and 3, this condition for the escape of steam or water vapor in bubbles being illustrated in Fig. 5. The particular advantage of the two tubes 31 and 32 comes in systems where vacuum conditions are liable to occur, or where the pressure in the system may become less than that of the atmosphere. Under such conditions, the action of the device is reversed, the water being depressed by the atmospheric pressure in the tubes 21 and 22 and rising in the tubes 31 and 32 until the water level in the tubes 21 and 22 is below the lower edge of the partition 29, whereupon air escapes from the tubes 21 and 22 under such lower edge into the tube 32, rising in such tube, ordinarily by bubbles, and escaping into the system through the opening 28 and connection 12, but retaining the water in the tubes 31 and 32 because the air separates from the water as it passes over the top of the partition 30 and the water drops down into the tube 31 and descends therein and through the opening 33 into the lower part of the tube 32, so that under this air-admitting condition a circulation of water is maintained upward in the tube 32 and downward in the tube 31. The tubes 31 and 32 are together preferably made of sufficient size so as to contain sufficient water for maintaining the seal of the pressure device when the vacuum condition in the system ceases to exist. The arrangement shown in Figs. 1, 2, and 3 will also serve to admit air to the system under vacuum conditions, in substantially the same way, but because of the singleness of the tube 27 in such arrangement the water seal may be lost when the vacuum condition ceases to exist if the air admission is sufficiently violent to carry with it into the system the water from the tube 27; so that for conditions where vacuum may exist the arrangement shown in Figs. 5 and 6 is preferred.

I claim as my invention:

1. A relief device for fluid pressure systems, comprising three liquid-containing tubes all higher at one end than at the other, two of said tubes being connected at a low point, a separating chamber provided with an outlet and into which said two tubes open upwardly at a high point on such tubes, said chamber being provided with a baffle plate above the point where said two tubes enter said chamber, and said third tube being connected to one of said first tubes at an intermediate point between the levels where such first two tubes are connected together and are connected to said chamber and being connected at a higher point to the pressure system, that one of said first two tubes to which the third tube is connected constituting the connection between the other of said first tubes and said third tube.

2. A relief device for fluid pressure systems, comprising three liquid-containing tubes all higher at one end than at the other, two of said tubes being connected at a low point, a separating chamber provided with an outlet and into which said two tubes open at a high point on such tubes, said chamber being provided with a baffle plate above the point where said two tubes enter said chamber, and said third tube being connected to one of said first tubes at an intermediate point between the levels where such first two tubes are connected together and are connected to said chamber and being connected at a higher point to the pressure system, said third tube being provided with a dividing partition through which the two parts of such tube are connected at higher and lower points, such higher point being higher than the lower part of the connection of said third tube to the pressure system and such lower point being lower than the connection of said third tube to one of said first two tubes.

3. A relief device for fluid pressure systems, comprising three liquid-containing tubes all higher at one end than at the other, two of said tubes being connected at a low point, a separating chamber provided with an outlet and into which said two tubes open at a high point on such tubes, and said third tube being connected to one of said first tubes at an intermediate point between the levels where such first two tubes are connected together and are connected to said chamber and being connected at a higher point to the pressure system, said third tube being provided with a dividing partition through which the two parts of such tube are connected at higher and lower points, such higher point being higher than the lower part of the connection of said third tube to the pressure system and such lower point being lower than the connection of said third tube to one of said first two tubes.

4. A relief device for fluid pressure systems, comprising three liquid-containing tubes all higher at one end than at the other, two of said tubes being connected at a low point, a separating chamber provided with an outlet and into which said two tubes open at a high point on such tubes, said chamber being provided with a baffle plate above the point where said two tubes enter said chamber, and said third tube being connected to one of said first tubes at an intermediate point between the levels where such first two tubes are connected together and are connected to said chamber and being connected at a higher point to the pressure system, said third tube being provided with a dividing partition through which the two parts of such tube are connected at higher and lower points.

5. A relief device for fluid pressure systems, comprising three liquid-containing tubes all higher at one end than at the other, two of said tubes being connected at a low point, a separating chamber provided with an outlet and into which said two tubes open at a high point on such tubes, and said third tube being connected to one of said first tubes at an intermediate point between the levels where such first two tubes are connected together and are connected to said chamber and being connected at a higher point to the pressure system, said third tube being provided with a dividing partition through which the two parts of such tube are connected at higher and lower points.

6. A relief device for fluid pressure systems, comprising three liquid-containing tubes all higher at one end than at the other, two of said tubes being connected at a low point, a separating chamber provided with an outlet and into which said two tubes open at a high point on such tubes, said chamber being provided with a baffle plate above the point where said two tubes enter said chamber, and said third tube being connected to one of said first tubes at an intermediate point between the levels where such first two tubes are connected together and are connected to said chamber and being connected at a higher point to the pressure system, that one of said first two tubes to which said third tube is connected projecting upward into said chamber and the capacity of said chamber below the top of the tube which projects into it being sufficient to hold all the liquid from said tube above the point of its connection to said third tube.

7. A relief device for fluid heating systems, comprising three liquid-containing tubes all higher at one end than at the other, two of said tubes being connected at a low point, a separating chamber provided with an outlet and into which said two tubes open at a high point on such tubes, and said third tube being connected to one of said first tubes at an intermediate point between the levels where such first two tubes are connected together and are connected to said chamber and being connected at a higher point to the pressure system, that one of said first two tubes to which said third tube is connected projecting upward into said chamber and the capacity of said chamber below the top of the tube which projects into it being sufficient to hold all the liquid from said tube above the point of its connection to said third tube.

8. A relief device for fluid pressure systems, comprising three liquid-containing tubes all higher at one end than at the other, two of said tubes being connected at a low point, a separating chamber provided with an outlet and into which said two tubes open at a high point on such tubes, said chamber being provided with a baffle plate above the point where said two tubes enter said chamber, and said third tube being connected to one of said first tubes at an intermediate point between the levels where such first two tubes are connected together and are connected to said chamber and being connected at a higher point to the pressure system, that one of said first two tubes to which said third tube is connected projecting upward into said chamber.

9. A relief device for fluid pressure systems, comprising three liquid-containing tubes all higher at one end than at the other, two of said tubes being interconnected at higher and lower points, one of said two tubes being connected at an intermediate point to a low point on said third tube and being connected at a higher point to the atmosphere, and said third tube being provided at a high point with an opening for connection to the associated pressure system, said third tube being provided with a dividing partition separating it into two parts which are connected at higher and lower points, the connection of said third tube to one of said first two tubes being by one of said parts.

10. As an article of manufacture, a relief device for fluid pressure systems, comprising two parts, one of said parts consisting of a unitary tubular member provided with longitudinal partitions so as to form three passageways of which the middle one is connected at a low point to one of the outside ones and at a higher point to the other outside one, said last-named outside passageway being provided with a connection inlet at a still higher point, and the other of said parts consisting of a vented hollow shell mounted on the top of the first part and communicating with the middle passageway and with the first of the outside passageways.

11. As an article of manufacture, a relief device for fluid pressure systems, comprising two parts, one of said parts consisting of a unitary tubular member provided with longitudinal partitions so as to form three passageways of which the middle one is connected at a low point to one of the outside ones and at a higher point to the other outside one, said last-named outside passageway being provided with a connection inlet at a still higher point, and the other of said parts consisting of a vented hollow shell mounted on the top of the first part and communicating with the middle passageway and with the first of the outside passageways, said second part having a baffle plate directly above the upper ends of the two passageways opening into it, the vent being above said baffle plate.

12. As an article of manufacture, a relief device for fluid pressure systems, comprising two parts, one of said parts consisting of a unitary tubular member provided with longitudinal partitions so as to form three passageways of which the middle one is connected at a low point to one of the outside ones and at a higher point to the other outside one, said last-named outside passageway being provided with a connection inlet at a still higher point, and the other of said parts consisting of a vented hollow shell mounted on the top of the first part and communicating with the middle passageway and with the first of the outside passageways, the first of said outside passageways opening into said chamber at a lower point than said middle passageway.

In witness whereof, I have hereunto set my hand at Wabash, Indiana, this 27th day of March, A. D. one thousand nine hundred and sixteen.

MARK C. HONEYWELL.

Witnesses:
D. W. RODIBAUGH,
M. WALKER.